(12) United States Patent
Wolfe et al.

(10) Patent No.: US 6,835,899 B2
(45) Date of Patent: Dec. 28, 2004

(54) LOAD SENSING ASSEMBLY FOR A VEHICLE SEAT

(75) Inventors: George B. Wolfe, Plymouth, MI (US); Charles E. Steffens, Jr., Washington, MI (US); Nick Smith, Southfield, MI (US); Donald J. Chomic, Whitmore Lake, MI (US); Todd R. Elkins-Trottier, Canton, MI (US)

(73) Assignees: TRW Inc., Lyndhurst, OH (US); TRW Vehicle Safety Systems Inc., Lyndhurst, OH (US); Johnson Controls Technology Company

(*) Notice: Subject to any disclaimer, the term of this patent is extended or adjusted under 35 U.S.C. 154(b) by 140 days.

(21) Appl. No.: 10/224,819

(22) Filed: Aug. 21, 2002

(65) Prior Publication Data

US 2004/0035613 A1 Feb. 26, 2004

(51) Int. Cl.[7] .................... B60R 21/32; G01G 19/52
(52) U.S. Cl. .................. 177/144; 180/273; 280/735
(58) Field of Search .................... 177/136, 144, 177/210 R; 340/667; 180/273; 280/735; 701/45; 73/768

(56) References Cited

U.S. PATENT DOCUMENTS

| | | | |
|---|---|---|---|
| 2,708,005 A | 5/1955 | Gazzo | 180/273 |
| 3,022,976 A | 2/1962 | Zia | 248/430 |
| 3,766,344 A | 10/1973 | Nevett | 200/85 A |
| 4,075,443 A | 2/1978 | Fatur | 200/85 A |
| 4,361,741 A | 11/1982 | Leskoverc et al. | 200/85 A |
| 5,232,243 A | 8/1993 | Blackburn et al. | 200/735 |
| 5,481,078 A | 1/1996 | Asche | 200/85 A |
| 5,502,284 A | 3/1996 | Meiller et al. | 200/85 A |
| 5,542,493 A | 8/1996 | Jacobson et al. | 180/272 |
| 5,624,132 A | 4/1997 | Blackburn et al. | 280/735 |
| 5,720,523 A | 2/1998 | Kawabata et al. | 297/338 |
| 5,739,757 A | 4/1998 | Gioutsos | 340/667 |
| 5,810,392 A | 9/1998 | Gagnon | 280/735 |
| 5,864,295 A | 1/1999 | Jarocha | 340/667 |
| 5,877,677 A | 3/1999 | Fleming et al. | 340/436 |
| 6,039,344 A | 3/2000 | Mehney et al. | 280/735 |
| 6,069,325 A | 5/2000 | Aoki | 177/144 |
| 6,323,443 B1 | 11/2001 | Aoki et al. | 177/136 |
| 6,407,347 B1 * | 6/2002 | Blakesley | 177/144 |
| 6,583,367 B2 * | 6/2003 | Wolfe et al. | 177/136 |

* cited by examiner

Primary Examiner—Randy W. Gibson
(74) Attorney, Agent, or Firm—Tarolli, Sundheim, Covell & Tummino L.L.P.

(57) ABSTRACT

An assembly (10) is used in a vehicle having a seat (2) for a vehicle occupant and a vehicle floor pan (4) for supporting the vehicle seat (2). The assembly (10) includes a vehicle seat frame (20) for supporting a load of the vehicle occupant in the vehicle seat (2), a sensor (79) for sensing the load of the vehicle occupant, and a housing (100) for transmitting the load of the vehicle occupant to the vehicle floor pan (4). The sensor (79) provides an output signal indicative of the amount of the load of the vehicle occupant. The housing (100) encloses the sensor (79) to protect the sensor (79).

33 Claims, 9 Drawing Sheets

US 6,835,899 B2

LOAD SENSING ASSEMBLY FOR A VEHICLE SEAT

TECHNICAL FIELD

The present invention relates to an assembly for sensing a load, and more particularly, to an assembly for sensing a load imparted to a vehicle seat by a vehicle occupant.

BACKGROUND OF THE INVENTION

A conventional vehicle occupant load sensing assembly includes a load sensor placed between a vehicle seat frame and a support bracket for the seat. The sensor is directly within the vertical load path of the occupant's weight and responds to the vertical loads imparted to the seat by the occupant of the seat. Since the seat frame and the support bracket must withstand large torque loads (i.e., tilting of the seat frame during crash conditions), typically the sensor also must be constructed to withstand large torque loads. This construction lessens the sensitivity of the sensor in the vertical load path. Thus, the sensor may not produce a reliable vertical load output signal.

SUMMARY OF THE INVENTION

In accordance with one feature of the present invention, an assembly is used in a vehicle having a seat for a vehicle occupant and a vehicle floor pan for supporting the vehicle seat. The assembly includes a vehicle seat frame for supporting a load of the vehicle occupant in the vehicle seat, a sensor for sensing the load of the vehicle occupant and providing an output signal indicative of the amount of the load of the vehicle occupant, and a housing for transmitting the load of the vehicle occupant to the vehicle floor pan and enclosing the sensor to protect the sensor.

In accordance with another feature of the present invention, an assembly is used in a vehicle having a seat for a vehicle occupant and a vehicle floor pan for supporting the vehicle seat. The assembly includes a vehicle seat frame for supporting a load of the vehicle occupant in the vehicle seat, a sensor for sensing the load of the vehicle occupant and providing an output signal indicative of the amount of the load of the vehicle occupant, and a housing for transmitting the load of the vehicle occupant to the vehicle floor pan. The sensor includes a sensor portion that moves in response to a change in the load of the vehicle occupant. The housing includes an over-travel limit portion for protecting the sensor from excessive movement of the sensor portion.

In accordance with still another feature of the present invention, an assembly is used in a vehicle having a seat for a vehicle occupant, a floor pan, and a cross bar located between the vehicle seat and the floor pan. The assembly includes a vehicle seat frame for supporting a load of the vehicle occupant in the vehicle seat, a sensor for sensing the load of the vehicle occupant and providing an output signal indicative of the amount of load of the vehicle occupant, and a housing supporting the sensor. The housing is for fixed attachment to the cross bar and transmitting the load of the vehicle occupant to the vehicle floor pan through the cross bar.

BRIEF DESCRIPTION OF THE DRAWINGS

The foregoing and other features of the invention will become more apparent to one skilled in the art upon consideration of the following description of the invention and the accompanying drawings, in which.

DESCRIPTION OF THE PREFERRED EMBODIMENTS

Figure 1:
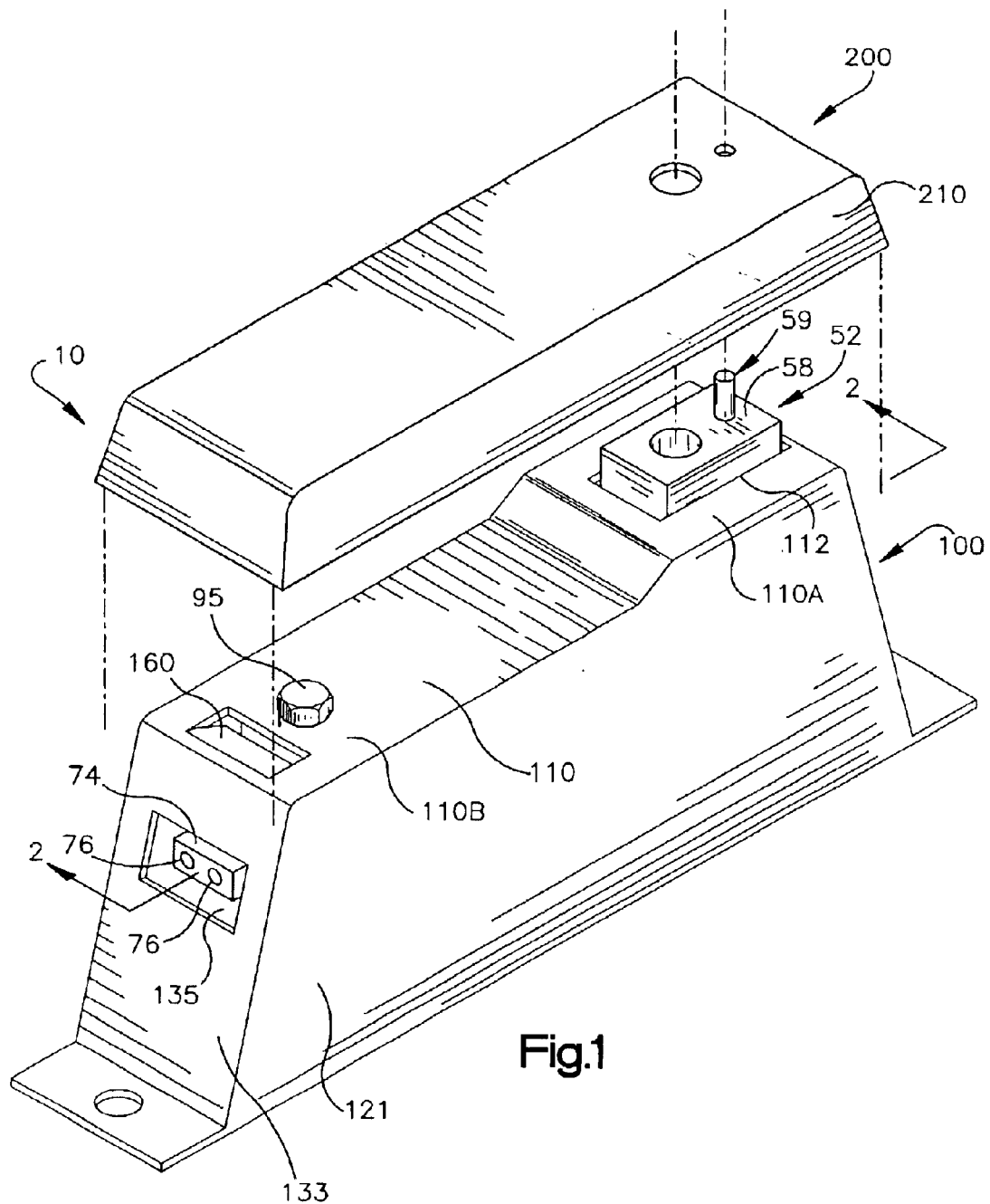
FIG. 1 is a schematic perspective view of an assembly embodying the present invention.

In accordance with one feature of the present invention, as shown in FIGS. 1–6, a load sensing assembly 10 is used in a vehicle having a seat 2 for a vehicle occupant. A vehicle floor pan 4 supports the assembly 10 and the vehicle seat 2. The assembly 10 includes a vehicle seat frame 20 for supporting a load of the vehicle occupant in the vehicle seat 2, an upper track 12 for supporting the vehicle seat frame, a lower track 16 for adjustably supporting the upper track, a sensor 40 for transmitting the load of the vehicle occupant from the lower track, a housing 100 for transmitting the load of the vehicle occupant from the linkage to the vehicle floor pan, a first fastener assembly 91, and a second fastener assembly 92.

The vehicle seat frame 20 supports a weight load of the vehicle occupant in the vehicle seat 2. The load of the vehicle occupant in the vehicle seat 2 is transmitted from the vehicle seat frame 20 through the upper track 12, the lower track 16, the sensor 40, the housing 100 to the vehicle floor pan 4. During a vehicle collision, the seat frame 20 may also sustain upward and lateral loads and loads in other directions.

Figure 3:
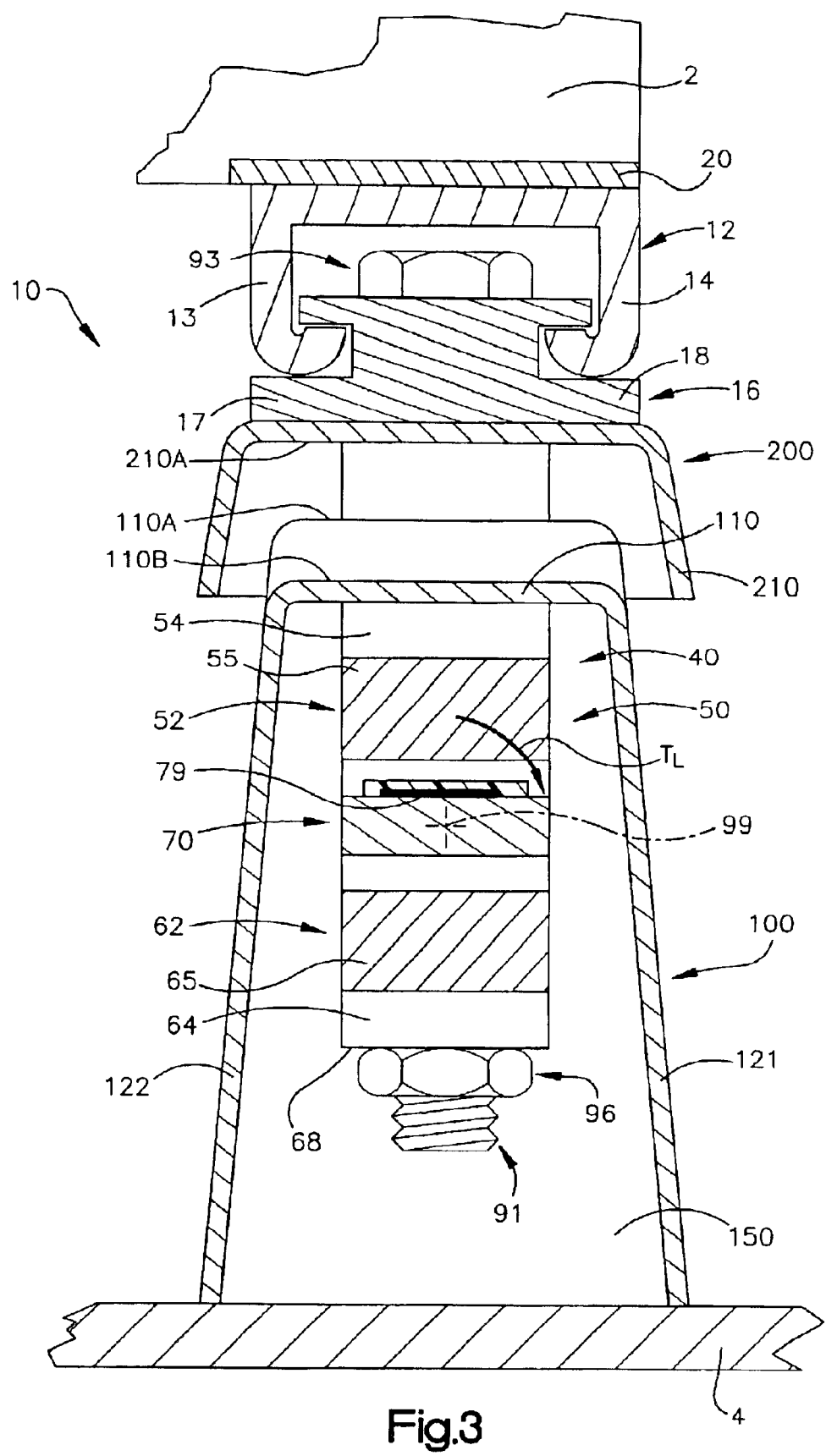
FIG. 3 is a schematic sectional view of the assembly of FIG. 2 taken along line 3—3 of FIG. 2.
Figure 4:
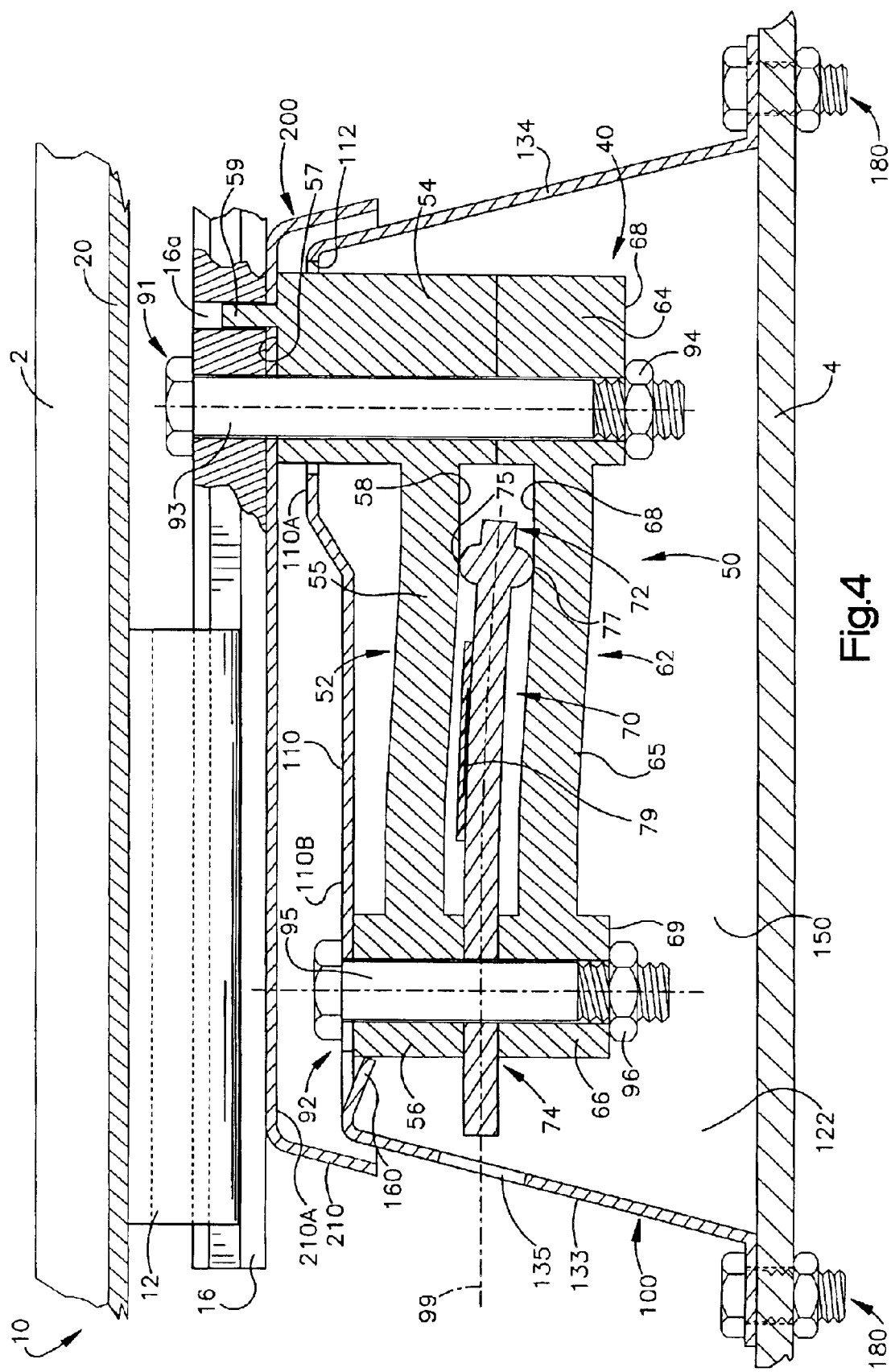
FIG. 4 is a schematic sectional view of the assembly of FIG. 2 under a loaded condition.
Figure 5:
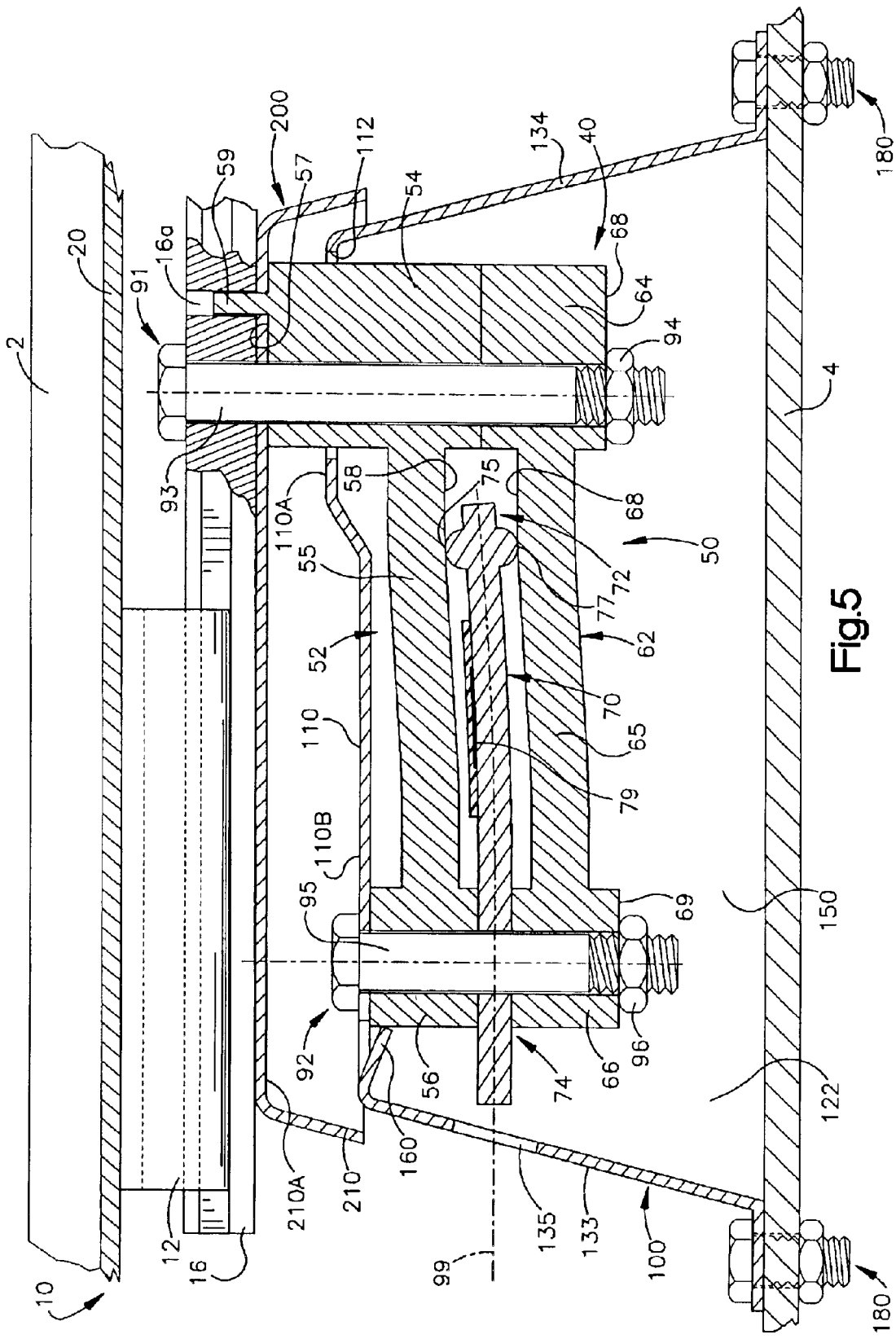
FIG. 5 is a schematic sectional view of the assembly of FIG. 2 under a different loaded condition.
Figure 6:
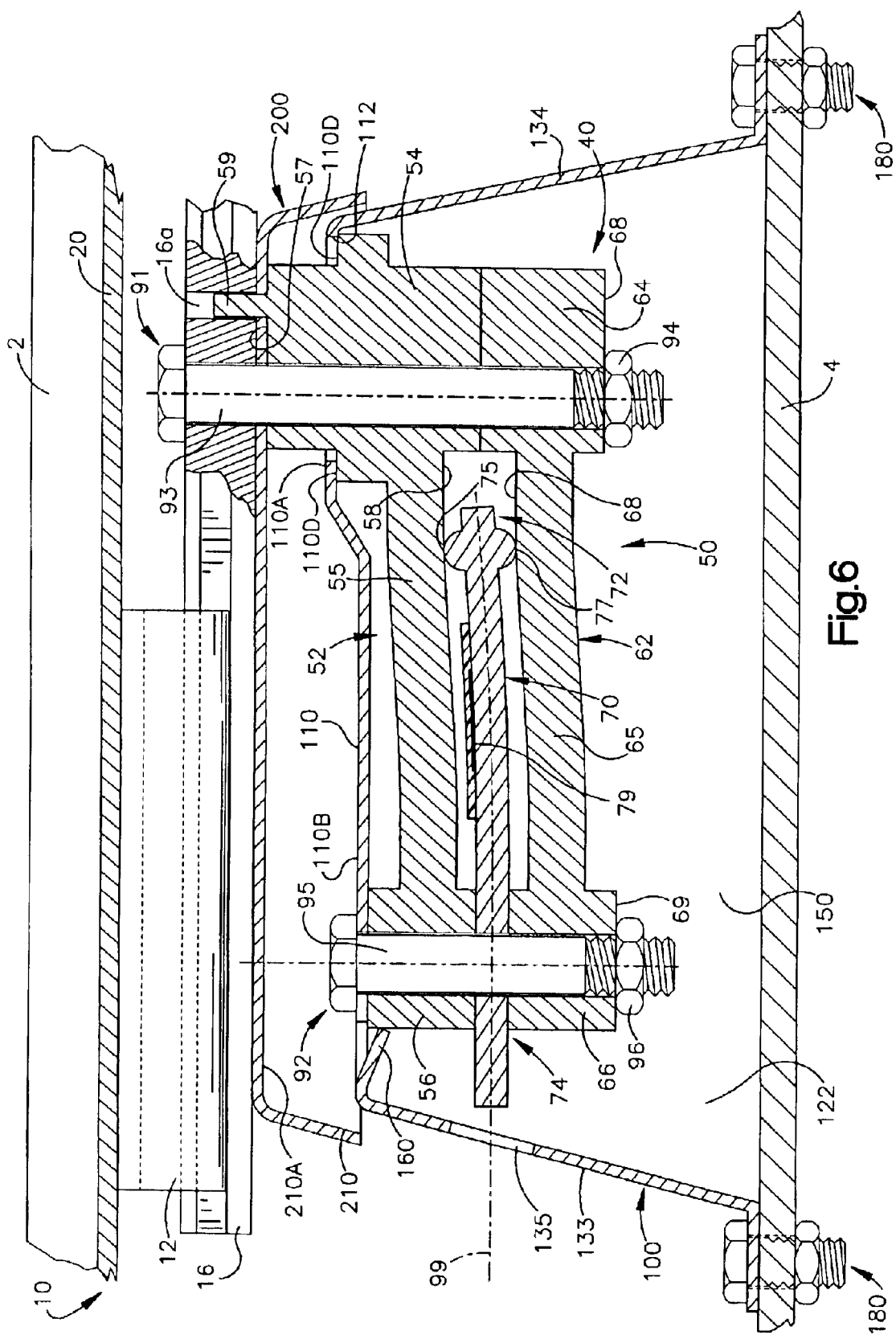
FIG. 6 is a schematic sectional view of another feature of the assembly of FIG. 5.

The upper track 12, or upper rail, is fixedly attached to the vehicle seat frame 20. The upper track 12 typically has two opposite side rails 13, 14 (FIG. 3). The lower track 16 has two opposite rails 17, 18 that slidingly engage the respective side rails 13, 14 of the upper track 12. The upper track 12 may slide on the lower track 16 for forward or rearward adjustment of the position of the seat 2 for occupants of different sizes, as is known in the art. It is known that some seats do not move (i.e., rear passenger seats). For these seats, the tracks 12, 16 may be omitted and the housing 100 attached directly to the vehicle seat frame 20.

The lower track 16, or lower rail, is disposed directly above the sensor 40 and is supported by the sensor. The sensor 40 senses the load of the vehicle occupant. The sensor 40 may comprise a parallelogram linkage 50, a sensor lever 70, and an electrical component 79. Other suitable sensor configurations may also be used.

The parallelogram linkage 50 defines a parallelogram in a vertical plane perpendicular to the vehicle floor pan 4 and parallel to the forward/rearward movement of the vehicle (as shown). The parallelogram linkage 50 includes a first beam 52 and a second beam 62 extending parallel to the first beam. The first and second beams 52, 62 have adjacent, fixedly interconnected first ends 54, 64 that receive the load of the vehicle occupant from the lower track 16. The first and second beams 52, 62 further have adjacent, fixedly interconnected second ends 56, 66 opposite the respective first ends 54, 64. Intermediate portions 55, 65 of the respective first and second beams 52, 62 interconnect the first ends 54, 64 and second ends 56, 66 of the first and second beams 52, 62, respectively. The second ends 56, 66 transmit the load of the vehicle occupant from the vehicle seat frame 20 to the housing 100.

The first end 54 of the first beam 52 has a placement pin 59 extending upward from an upper surface 57 of the first end. The placement pin 59 engages a corresponding bore 16a in the lower track 16 for facilitating proper positioning of the assembly 10 relative to the lower track and the seat frame 20. The placement pin 59 may also help prevent relative rotation between the vehicle seat frame 20 and the sensor 40.

The intermediate portions 55, 65 are identical in construction and bend in response to a load applied to the beams in an upward or downward direction. The sensor lever 70 is interposed between the intermediate portions 55, 65 and the second ends 56, 66 of the first and second beams 52, 62 (as shown). Alternatively, the sensor lever 70 may be interposed between the intermediate portions 55, 65 and the first ends 54, 64 of the first and second beams 52, 62 (not shown).

The intermediate portions 55, 65 of the first and second beams 52, 62 have smaller vertical dimensions than the ends 54, 56, 64, 66 of each beam 52, 62 (as viewed in FIG. 1). The intermediate portions 55, 65 are vertically thinner than the ends 54, 56, 64, 66. The vertically larger ends 54, 56, 64, 66 and the intermediate portions of the beams 52, 62 create a closed parallelogram (as viewed in FIG. 2).

The sensor lever 70, or sensor portion, has a longitudinal axis 99. The sensor lever 70 and its longitudinal axis 99 extend horizontally in an unloaded, or unstressed, condition of the sensor lever 70 (as viewed in FIG. 2). The first and second beams 52, 62 are disposed above and below, respectively, the axis 99 of the sensor lever 70 with the intermediate portions 55, 65 of the beams located at equal distances from the axis (as viewed in FIG. 2). The sensor lever 70 further has a first end portion 72 and a second end portion 74 opposite the first end portion. The second end portion 74 of the sensor lever 70 is interposed between, and has a fixed connection with, the second ends 56, 66 of the first and second beams 52, 62 (as shown). The second end portion 74 of the sensor lever 70 has an opening (not shown) for fixing the sensor lever 70 in the interposed position between the second ends 56, 66 of the first and second beams 52, 62.

The first end portion 72 of the sensor lever 70 is operatively associated with the intermediate portions 55, 65 of the first and second beams 52, 62. The sensor lever 70 thereby bends upon vertical movement of the first ends 54, 64 of the first and second beams 52, 62 (as viewed in FIGS. 4 and 5).

The sensor lever 70 typically has a vertical thickness substantially less than that of each intermediate portion 55, 65 such that the stiffness of the sensor lever is typically about one-tenth that of the combined stiffness of the intermediate portions. For example, if a ten-pound vertical load would deflect the sensor lever 70 a predetermined amount, a one hundred pound vertical load would be required to deflect the two intermediate portions 55, 65 that same predetermined amount.

The sensor lever 70 and the first and second beams 52, 62 are typically constructed of a suitable spring-like material such as steel or an engineered laminate. Aluminum may also be used entirely or in combination with steel or other suitable material.

The electrical component 79 senses the bending of the sensor lever 70 and provides an electrical output signal indicative of the amount of bending of the sensor lever. The amount of bending of the sensor lever 70 is directly related to the amount of bending of the first and second beams 52, 62. The electrical component 79 provides an output signal dependent upon the amount of bending of the beams 52, 62. The electrical component 79 is preferably a strain gauge sensor that is applied to the first end portion 72 of the sensor lever 70, by a suitable process. Alternatively, piezoelectric, capacitance, or other suitable electrical components may be used.

The electrical component 79 may be applied to the upper surface (FIG. 2) or the lower surface (not shown) of the first end portion 72 of the sensor lever 70. The first end portion 72 of the sensor lever 70 may be over-molded with a polymer for environmentally sealing the electrical component 79 mounted thereon. The first end portion 72 of the sensor lever 70 may then have a greater vertical thickness than the unsealed second end portion 74 of the sensor lever 70.

The first end portion 72 of the sensor lever 70 further includes an upper curved surface 75 and a lower curved surface 77. The upper curved surface 75 engages a lower surface 58 of the intermediate portion 55 of the first beam 52. The lower curved surface 77 engages an upper surface 68 of the intermediate portion 65 of the second beam 62. These curved surfaces 75, 77 may be portions of a sphere or some other suitably curved shape. The curved surfaces 75, 77 may also be curved end portions of fasteners, such as rivets, mounted on the sensor lever 70 (as viewed in the FIGS.) or one each mounted on the upper and lower surfaces 58, 68 of the intermediate portions 55, 65 of the first and second beams 52, 62 (not shown).

Figure 2:
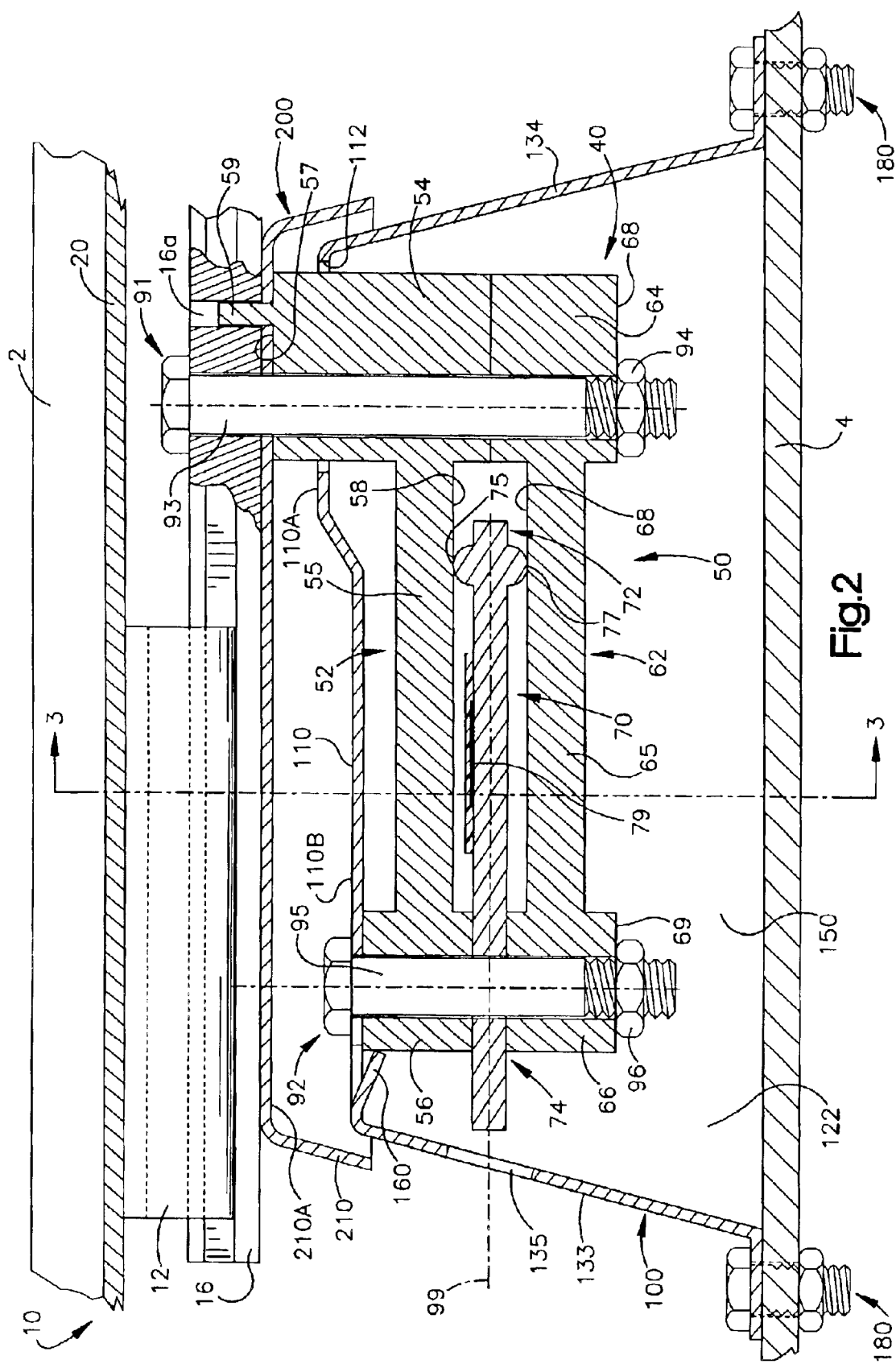
FIG. 2 is a schematic sectional view of the assembly of FIG. 1 taken along line 2—2 of FIG. 1.

The sensor lever 70 essentially bends only in a vertical plane about a horizontal axis (as viewed in FIG. 2). Thus, the sensor lever 70 is a singularly fixed beam with a load applied to its end. The lower and upper surfaces 58, 68 of the beams 52, 62 define spherical actuation points that will "roll" with the upper and lower curved surfaces 75, 77, respectively, if a torsional load (TL in FIG. 3), which tends to twist the parallelogram linkage 50 about the axis 99, for example, is placed on the parallelogram linkage 50. A lateral load on the parallelogram linkage 50 is transferred through both beams 52, 62 from the lower track 16 to the housing 100. The sensor lever 70 and the electrical component 79 thereby incur minimal torsional or lateral loading due to the spherical actuation points that allow minimal torsional deflection of the sensor lever 70 as the parallelogram linkage 50 is twisted by the torsional load TL about the axis 99. Thus, as stated above, the sensor lever 70 acts as a singularly fixed beam with a load applied to its end.

The housing 100 has a horizontal portion 110 with an upper area 110A and a vertically lower area 110B, a first side portion 121 extending laterally downward at an obtuse angle from the horizontal portion toward the vehicle floor pan 4 and a second side portion 122 opposite the first side portion and extending laterally downward from the horizontal portion at an obtuse angle toward the vehicle floor pan. The housing 100 further has a third side portion 133 extending vertically downward at an obtuse angle from the horizontal portion 110 toward the vehicle floor pan 4 and a fourth side portion 134 opposite the third side portion and extending vertically downward at an obtuse angle from the horizontal portion toward the vehicle floor pan.

The first and second side portions 121, 122 define quasi-parallel planes. The first and second side portions 121, 122 also define planes that are essentially perpendicular to planes defined by the third and fourth portions 133, 134. Thus, the four side portions 121, 122, 133, 134 define an inverted box section with slightly tapered sides (i.e., a frusto-rectangular pyramid). The horizontal portion 110 and the four side portions 121, 122, 133, 134 form an enclosed chamber 150 when the housing 100 is secured to the vehicle floor pan 4. As viewed in FIG. 2, the housing 100 may be secured to the vehicle floor pan 4 by conventional fasteners 180 or by another suitable method such as welding. Thus, as stated above, the housing 100 defines a rigid box section within which the electrical component 79 may be mounted with the vehicle floor pan 4 and housing absorbing loads created by the attachment to the vehicle floor pan.

The second ends 56, 66 of the first and second beams 52, 62 are fixed to the lower area 110B by the second fastener assembly 92. The first end 54 of the first beam 52 extends vertically upward out of the chamber 150 through an opening 112 in the upper area 110A of the housing 100. The opening 112 is larger than the first end 54 to allow vertical movement of the first end through the opening. The opening 112 may further provide a supplemental lateral travel stop in the horizontal direction for the sensor 40 when the seat 2 incurs excessive lateral loading. As the sensor 40 deflects in a horizontal plane and the first end 54 of the sensor 40 contacts an edge surface of the opening 112, the lateral load will be transferred from the seat frame 20 directly to the housing 100.

The first ends 54, 64 of the first and second beams 52, 62 may thereby be secured to the lower track 16 by the first fastener assembly 91. The horizontal portion 110 is vertically offset (typically about 1.25 mm) to define the areas 110A, 110B so that the first ends 54, 64 of the first and second beams 52, 62 may move vertically relative to the housing 100 as the vehicle seat frame 20 moves downward (or upward) under loading conditions. The rigid box configuration of the housing 100 causes all loads to be transferred through the first and second beams 52, 62 to the floor pan 4 with the stiffness of the beams allowing minimal bending and deflection.

The assembly 10 may also include a shield member 200 for protecting the first end 54 of the first beam 52 extending upward from the upper area 110A of the housing 100 (as shown). The shield member 200 is interposed between the lower track 16 and the housing 100. Other positions and configurations of the shield member 200 may also be used.

The shield member 200 is secured to the lower track 16 such that the shield member overlies the housing 100 and moves vertically with the first end 54, 64 of the sensor 40 as the vehicle seat 2 incurs vertical loading. The shield member 200 has an opening 202 for allowing the placement pin 59 of the sensor 40 to extend through the shield member and engage the bore 16a of the lower track 16, as described above. The shield member 200 further has a skirt portion 210 that surrounds the horizontal portion 110 of the housing 100 and helps protect the sensor 40 from foreign objects entering from the sides of the shield member 200.

The upper area 110A of the horizontal portion 110 of the housing 100 prevents overloading of the sensor 40 from excessive downward vertical loads incurred by the vehicle seat frame 20. The offset upper area 110A, acting as a downward travel stop for the sensor 40, typically allows about 1.25 mm downward travel of the first ends 54, 64 of the first and second beams 52, 62.

The upper surface of the first intermediate portion 55 may prevent overloading of the sensor 40 from excessive upward vertical loads incurred by the vehicle seat frame 20. Alternatively, as viewed in FIG. 6, the first end portion 54 of the first beam 52 may have projecting members 110D that act as upward travel stops. The projecting members 110D typically allow about 1.25 mm upward travel of the first ends 54, 64 of the first and second beams 52, 62.

The first fastener assembly 91 includes a first fastener 93 and a first fastener member 94. The first fastener 93 may be a bolt or rivet with a head that engages the lower track 16. As viewed in FIGS. 2–6, the shaft of the first fastener 93 extends downward from the head through an opening in the lower track 16, an opening in the shield member 200, an opening in the first end 54 of the first beam 52, and an opening in the first end 64 of the second beam 62.

The first fastener member 94 may be a nut that is threaded onto a bolt or a fastener secured to a rivet and engages a lower surface 68 of the first end 64 of the second beam 62. The first fastener 93 and first fastener member 94 thereby fixedly secure the lower track 16, the shield member 200, the first end 54 of the first beam 52, and the first end 64 of the second beam 62 together as the first fastener member 94 is tightened sufficiently against the lower surface 68 of the first end 64 of the second beam 62.

The first fastener member 94 should be secured to the first fastener 93 in order to produce a clamping force sufficient to prevent relative movement of the elements between the head of the fastener and the fastener member under any possible load conditions. If the fastener 93 is a bolt and the first fastener member 94 is a nut, tightening the nut to a torque of at least 60 nm typically achieves this.

The second fastener assembly 92 includes a second fastener 95 and a second fastener member 96. The second fastener 95 may be a bolt or rivet with a head that engages the lower area 110B of the housing 100. As viewed in FIGS. 2–6, the shaft of the second fastener 95 extends downward from the head through an opening in the lower area 110B of the housing 100, an opening in the second end 56 of the first beam 52, an opening in the second end portion 74 of the sensor lever 70, and an opening in the second end 66 of the second beam 62.

The second fastener member 96 may be a nut that is threaded onto a bolt or a fastener secured to a rivet and engages a lower surface 69 of the second end 66 of the second beam 62. The second fastener 95 and second fastener member 96 thereby fixedly secure the housing 100, the second end 56 of the first beam 52, the second end portion 74 of the sensor lever 70, and the second end 66 of the second beam 62 together as the second fastener member 96 is tightened sufficiently against the lower surface 69 of the second end 66 of the second beam 62.

The second fastener member 96 should be secured to the second fastener 95 in order to produce a clamping force sufficient to prevent relative movement of the elements between the head of the second fastener and the second fastener member under any possible load conditions. If the second fastener 95 is a bolt and the second fastener member 96 is a nut, tightening the nut to a torque of at least 60 nm typically achieves this.

The fasteners 93, 95 and the fastener members 94, 96 of each fastener assembly 91, 92 may be constructed of a suitable metal such as stainless steel. Other materials with corrosion-resistant coatings and sufficient strength may also be used.

The sensor 40 may be further secured against lateral and rotational movement relative to the housing 100. The housing 100 has a projecting member 160 extending into the chamber 150 and abuttingly engaging the second end 56 of the first beam 52. The projecting member 160 thereby prevents rotation of the sensor 40 relative to the housing 100 in a horizontal plane about a vertical axis.

When a downward load is placed on the vehicle seat frame 20, the downward load is transmitted through the vehicle seat frame, upper track 12, the lower track 16, and the shield member 200 to the first end 54 of the first beam 52 and the first end 64 of the second beam 62. Since the second ends 56, 66 of the first and second beams 52, 62 are fixed to the housing 100, the first ends 54, 64 of the first and second beams 52, 62 will move downward with the vehicle seat frame 20. As the first ends 54, 64 move downward, the intermediate portions 55, 65 resiliently deflect downward (as viewed in FIG. 4).

The first and second beams 52, 62 act as spring elements and transfer the load from the vehicle seat frame 20 to the housing 100 and the vehicle floor pan 4. The thinner vertical dimensions of the intermediate portions 55, 65 of the first and second beams 52, 62 facilitate downward deflection of the beams while the second ends 56, 66 remain vertically fixed relative to the vehicle floor pan 4.

An assembly 10 may be fixed to the vehicle floor pan 4 at least at two locations and preferably four locations, i.e., at each corner of the seat 2. Thus, the vehicle seat frame 20 is constrained to move only vertically (linearly downward). The vehicle seat frame 20 does not move horizontally or rotationally. The deflected intermediate portions 55, 65 of the beams 52, 62 assume an "S" shape (as viewed in FIG. 4). The surface 210A of the shield member 200 may move downward until it contacts the upper area 110A, at which point the beams 52, 62 deflect no further. At this point, all downward loads will be transmitted directly through the housing 100. This protects the sensor 40 from downward vertical load damage.

When an upward load is placed on the vehicle seat frame 20, the upward load is transmitted through the vehicle seat frame, the upper track 12, the lower track 16, and the shield member 200 to the first end 54 of the first beam 52 and the first end 64 of the second beam 62. Since the second ends 56, 66 of the first and second beams 52, 62 are fixed to the housing 100 and the vehicle floor pan 4, the first ends 54, 64 of the first and second beams 52, 62 will move upward with the vehicle seat frame 20 and the intermediate portions 55, 65 of the beams will resiliently deflect upward (as viewed in FIG. 5). The thinner vertical dimensions of the intermediate portions 55, 65 of the first and second beams 52, 62 facilitate upward deflection while the second ends 56, 66 remain vertically fixed relative to the housing 100 and the vehicle floor pan 4. Since the vehicle seat frame 20 is constrained to move essentially only vertically (linearly upward), as discussed above, the deflected intermediate portions 55, 65 assume a sideways "S" shape (as viewed in FIG. 5). When the upward vertical load deflects the sensor 40, the beams 52, 62 move upward until the upper surfaces of the projecting members 110D contact the lower surface of the upper area 110A (as alternatively shown in FIG. 6). Thus, the housing 100 protects the sensor 40 from upward vertical load damage.

The parallelogram linkage 50 may receive cross-car forces that act transverse to the axis 99 of the sensor lever 70. Such forces may impart torsional forces TL about the axis 99 to the first and second beams 52, 62. However, any rotation that is incurred by the parallelogram linkage 50 about the axis 99 will not significantly affect the spring rate, or stiffness, of the beams 52, 62 to vertical loading at the first ends 54, 64 of the first and second beams 52, 62. The dual, identical beam configuration, with each intermediate portion 55, 65 being of identical construction and identically associated with the axis 99, balances any rotation about the axis created by torsional loading such that the effective moment of inertia and vertical spring rate of the beams about the axis remains unchanged. For example, if torsional loading of the beams 52, 62 occurs, tension or compression induced in beam 52 would be offset by equal and opposite tension and compression induced in beam 62. Likewise, the change in moment of inertia about the axis 99 caused by the torsional deflection of the beam 52 would be offset by an equal and opposite change in moment of inertia about the axis caused by the torsional deflection of the beam 62.

Also, the first and second beams 52, 62, acting together in tandem, balance any cross-sectional deformations (as viewed in FIG. 3) of the beams that would alter the vertical spring rate as compared to using only one beam. Thus, the vertical spring rate remains constant even after some deflection (and some cross-sectional deformation) has occurred.

The relationship of the vertical load placed on the first ends 54, 64 of the beams 52, 62 by the lower track 16 to the vertical displacement of the first ends of the beams is linear and the same in both the upward and downward directions of movement of the lower track. Thus, the output of the electrical component 79 on the sensor lever 70 is also linear, and the same in both the upward and downward directions of movement of the vehicle seat frame 20.

Any initial stresses incurred by the electrical component 79 due to initial bending of the sensor lever 70 by manufacturing tolerances or assembly (i.e., tightening of the fasteners, etc.) may be factored out during an initial calibration of the electrical component. The sensor lever 70 essentially bends only in a vertical plane about a horizontal axis (as viewed in FIG. 1). As stated earlier, torsional and lateral stresses are decoupled from the bending stresses by the upper and lower curved surfaces 75, 77 of the first end portion 72 of the sensor lever 70.

The first end portion 72 of the sensor lever 70 pivots (deflects) as the first end portion 72 is forced downward or upward by the intermediate portions 55, 65 of the first and second beams 52, 62. As viewed in FIGS. 4 and 5, the first and second beams 52, 62 are forced into the sideways "S" shape while the sensor lever 70 is bent downward or upward as a free-ended cantilever.

The electrical component 79 produces an output signal directly proportional to the vertical force applied to the vehicle seat frame 20 via the vehicle seat 2 (i.e., the weight of the vehicle occupant, a load incurred during a vehicle collision, etc.). Overloading of the electrical component 79 may be prevented by the upper area 110A of the horizontal portion 110 and the projecting members 110D, as discussed above. The electrical component 79, while preferably a strain gauge sensor, may be any comparable electrical component.

Figure 7:
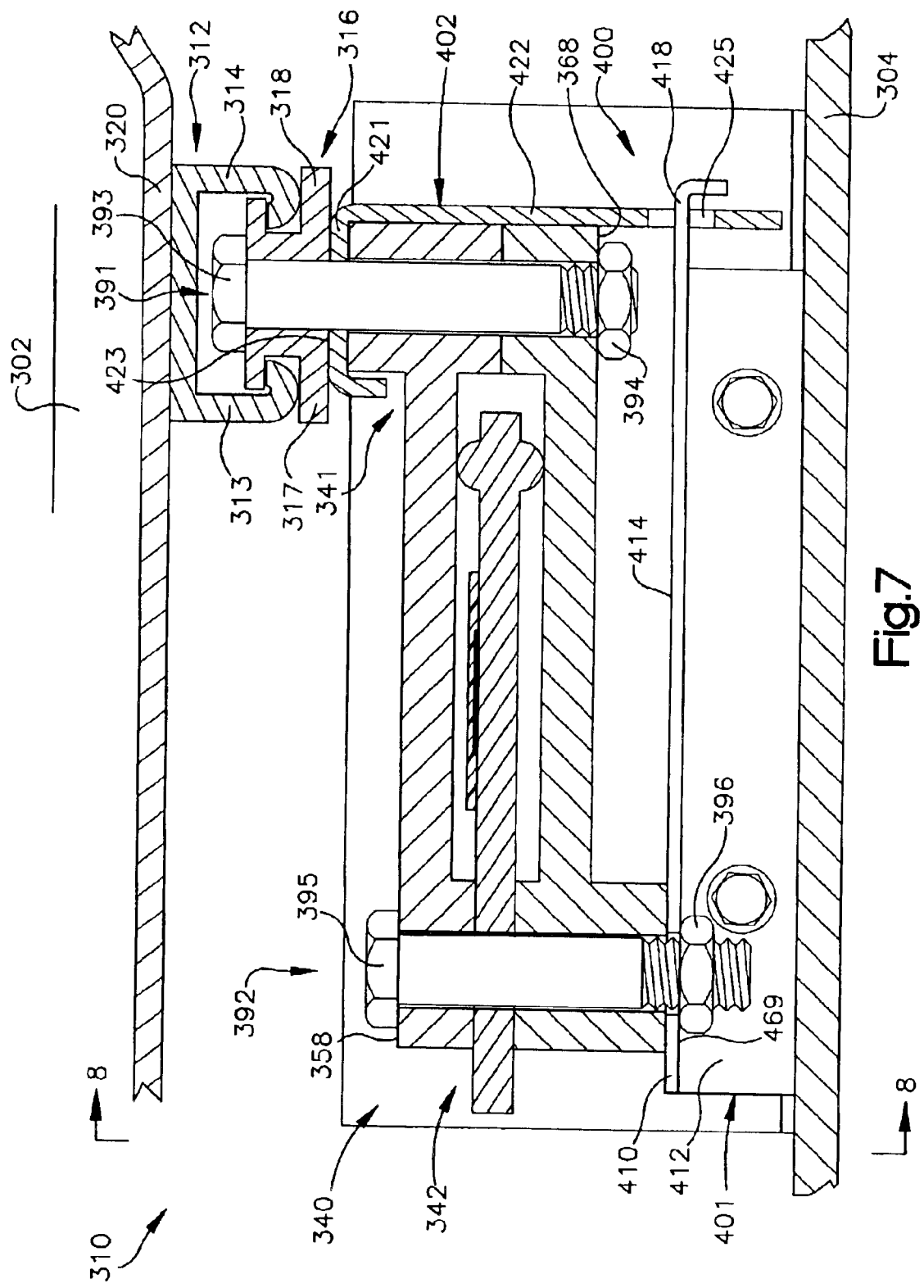
FIG. 7 is a schematic sectional view of an assembly embodying another feature of the present invention.
Figure 8:
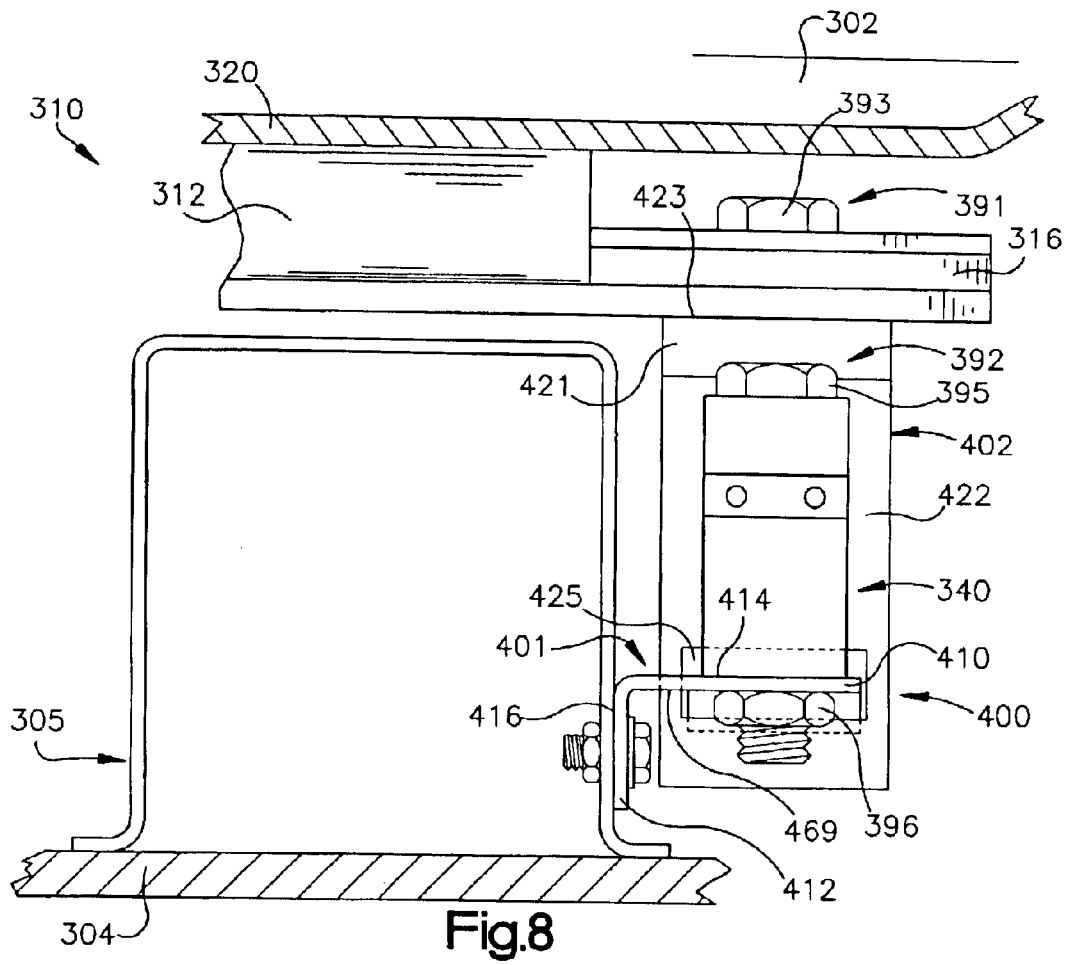
FIG. 8 is a schematic sectional view of the assembly of FIG. 7 taken along line 8—8 of FIG. 7.

In accordance with another feature of the present invention, as shown in FIGS. 7–8, a load sensing assembly 310 is used in a vehicle having a seat 302 for a vehicle occupant. A vehicle floor pan 304 supports the assembly 310 and the vehicle seat 302. The assembly 310 includes a vehicle seat frame 320 for supporting a load of the vehicle occupant in the vehicle seat 302, an upper track 312 for supporting the vehicle seat frame, a lower track 316 for adjustably supporting the upper track, a sensor 340 for transmitting the load of the vehicle occupant from the lower track, a housing assembly 400 for transmitting the load of the vehicle occupant from the linkage to the vehicle floor pan, a first fastener assembly 391, and a second fastener assembly 392.

The vehicle seat frame 320 supports a weight load of the vehicle occupant in the vehicle seat 302. The load of the vehicle occupant in the vehicle seat 302 is transmitted from the vehicle seat frame 320 through upper track 312, the lower track 316, the sensor 340, and the housing assembly 400 to the vehicle floor pan 304. During a vehicle collision, the seat frame 320 may also sustain upward and lateral loads and loads in other directions.

The upper track 312 is fixedly attached to the vehicle seat frame 320. The upper track 312 typically has two opposite side rails 313, 314 (FIG. 7). The lower track 316 has two opposite rails 317, 318 that slidingly engage the respective side rails 313, 314 of the upper track 312. The upper track 312 may slide on the lower track 316 for forward or rearward adjustment of the position of the seat 302 for occupants of different sizes, as is known in the art. It is known that some seats do not move. For these seats, the tracks 312, 316 may be omitted and the housing assembly 400 attached directly to the vehicle seat frame 320.

The lower track 316 is supported by the sensor 340. The sensor 340 senses the load of the vehicle occupant. The sensor 340 may comprise a parallelogram linkage, sensor lever, and electrical component similar to the parallelogram linkage 50, sensor lever 70, and electrical component 79. Other suitable sensor configurations may also be used. The sensor 340 has a first end 341 and an opposite second end 342.

The housing assembly 400 includes a first mounting bracket 401 (or first mounting member) and a second mounting bracket 402 (or second mounting member). The first mounting bracket 401 has a first horizontal portion 410 and a second vertical portion 412. The first portion 410 has a horizontal surface 414 for connection to the sensor 340. The second portion 412 has a vertical surface 416 for connection to a cross beam 305 fixedly attached to the vehicle floor pan 304.

The cross beam 305, or cross bar, typically extends laterally in a direction perpendicular to the upper and lower tracks 312, 316. As viewed in FIG. 8, the cross beam 305 has an inverted U-shape with two spaced apart, vertical walls extending from a horizontal base wall. The horizontal base wall interconnects the vertical walls. The second portion 412 of the first bracket 401 may be attached to one of the vertical walls of the cross beam 305 by fasteners, weld(s), or other known method that provides suitable strength. The first bracket 401 further has a projecting member 418 for operatively engaging a part of the second bracket 402.

The second bracket 402 includes a first horizontal portion 421 and a second vertical portion 422. The first portion 421 has a horizontal surface 423 for connection to the lower track 416. The second portion 422 has an opening 425 through which the projecting member 418 extends, as discussed above.

The first fastener assembly 391 includes a first fastener 393 and a first fastener member 394. The first fastener 393 may be a bolt or rivet with a head that engages the lower track 316. As viewed in FIGS. 7 and 8, the shaft of the first fastener 393 extends downward from the head through an opening in the lower track 316, an opening in the first horizontal portion 421 of the second bracket 402, and an opening in the first end 341 of the sensor 340.

The first fastener member 394 may be a nut that is threaded onto a bolt or a fastener attached to the shaft of a rivet and engages a lower surface 368 of the first end 341 of the sensor 340. The first fastener 393 and first fastener member 394 thereby fixedly secure the lower track 316, the second bracket 402, and the first end 341 of the sensor 340 together as the first fastener member 394 is tightened sufficiently against the lower surface 368 of the first end 341 of the sensor.

The first fastener member 394 should be secured to the first fastener 393 in order to produce a clamping force sufficient to prevent relative movement of the elements between the head of the fastener and the fastener member under any possible load conditions. If the fastener 393 is a bolt and the first fastener member 394 is a nut, tightening the nut to a torque of at least 60 nm typically achieves this.

The second fastener assembly 392 includes a second fastener 395 and a second fastener member 396. The second fastener 395 may be a bolt or rivet with a head that engages an upper surface 358 of the second end 342 of the sensor 340. As viewed in FIGS. 7 and 8, the shaft of the second fastener 395 extends downward from the head through an opening in the second end 342 of the sensor 340 and an opening in the first horizontal portion 410 of the first bracket 401.

The second fastener member 396 may be a nut that is threaded onto a bolt or a fastener attached to the shaft of a rivet and engages a lower surface 469 of the first horizontal portion 410 of the first bracket 401. The second fastener 395 and second fastener member 396 thereby fixedly secure the sensor 340, the first bracket 401, the cross beam 305, and the floor pan 304 together as the second fastener member 396 is tightened sufficiently against the lower surface 469 of the first horizontal portion 410 of the first bracket 401.

The first fastener member 396 should be secured to the first fastener 395 in order to produce a clamping force sufficient to prevent relative movement of the elements between the head of the fastener and the fastener member under any possible load conditions. If the fastener 395 is a bolt and the first fastener member 396 is a nut, tightening the nut to a torque of at least 60 nm typically achieves this.

The fasteners 393, 395 and the fastener members 394, 396 of each fastener assembly 391, 392 may be constructed of a suitable metal such as stainless steel. Other materials with corrosion-resistant coatings and sufficient strength may also be used.

The sensor 340 may be further secured against lateral and rotational movement relative to the housing assembly 400. Third and fourth fastener assemblies (not shown) may further secure the first end 341 and the second end 342 of the sensor 340 to the first bracket 401 and the second bracket 402, respectively, thereby preventing rotation of the sensor relative to the first and second brackets in a horizontal plane about a vertical axis.

When a downward load is placed on the vehicle seat frame 320, the downward load is transmitted through the vehicle seat frame, the upper track 312, the lower track 316, and the second bracket 402 to the first end 341 of the sensor 340. Since second end 342 of the sensor 340 is fixed to the first bracket 401, the vehicle seat frame 320 resiliently deflects the sensor, as discussed above with respect to FIGS. 1–6.

The sensor 340 acts as a spring element and transfers the load from the vehicle seat frame 320 to the first bracket 401, the cross beam 305, and the vehicle floor pan 304.

An assembly 310 may be fixed to a cross beam at least at two locations and preferably four locations, i.e., at each corner of the seat 302. Thus, the vehicle seat frame 320 is constrained to move only vertically (linearly downward). The vehicle seat frame 320 does not move horizontally or rotationally.

The sensor 340 may deflect downward until an upper edge of the opening 425 of the second bracket 402 contacts an upper surface of the projecting member 418 of the first bracket 401, at which point the sensor may deflect downward no further. At this point, all downward loads will be transmitted directly through the first bracket 401. This protects the sensor 340 from downward vertical load damage.

When an upward load is placed on the vehicle seat frame 320, the upward load is transmitted through the vehicle seat frame, the upper track 312, the lower track 316, and the second bracket 402 to the first end 341 of the sensor 340. Since the second end 342 of the sensor 340 is fixed to the first bracket 401, the vehicle seat frame 320 resiliently deflects the sensor, as discussed above with respect to FIGS. 1–6.

The sensor 340 acts as a spring element and transfers the load from the vehicle seat frame 320 to the first bracket 401, the cross beam 305, and the vehicle floor pan 304. An assembly 310 may be fixed to a cross beam at least at two locations and preferably four locations, i.e., at each corner of the seat 302. Thus, the vehicle seat frame 320 is constrained to move only vertically (linearly upward). The vehicle seat frame 320 does not move horizontally or rotationally.

The sensor 340 may deflect upward until a lower edge of the opening 425 of the second bracket 402 contacts a lower surface of the projecting member 418 of the first bracket 401, at which point the sensor 340 may deflect upward no further. At this point, all upward loads will be transmitted directly through the first bracket 401. This protects the sensor 340 from upward vertical load damage.

The vertical dimension of the opening 425 may typically be the vertical thickness of the horizontal first portion 410 of the first bracket 401 plus 2.5 mm. This dimension may allow the seat frame 320 to move a maximum of 1.25 mm downward and 1.25 mm upward when loads are placed on it by a vehicle occupant.

The sensor 340 may receive cross-car forces. Such forces may impart torsional forces to the sensor 340. However, any rotation that is incurred by the sensor 340 will not significantly affect the spring rate, or stiffness, of the sensor to vertical loading, as discussed above with respect to FIGS. 1–6.

The assembly 10 or 310 may be placed at a corner of a rectangular seat frame and may be used in conjunction with other similar apparatuses to generate multiple signals (such as two at the front corners of a seat frame and two at the rear corners of a seat frame). A wire harness may transmit the output signals from the assemblies to an electrical controller. The assembly 10 or 310 may alternatively be mounted to a bracket that is separately mounted to the vehicle floor pan 4. Also, the assembly 10 or 310 may be mounted at a position 90° rotated from the position illustrated in FIGS. 1–8.

The electrical component 79 may be electrically connected to the controller by lead wires running to connector plugs 76 mounted on the second end portion 74 of the sensor lever 70. The connector plugs 76 may be connected to the electrical component 79 by lead wires (not shown) running through the sensor lever 70. The third side portion 133 of the housing 100 of assembly 10 has an opening 135 for allowing electrical connectors (not shown) to engage the connector plugs 76. Alternatively, the first side portion 121 of the housing 100 of assembly 10 may have an opening for connector plugs (not shown). The controller processes the signals from the assemblies at each corner of the seat and generates an output signal indicative of the load on the seat frame. The multiple signals also can be analyzed by the controller to produce output signals for controlling occupant protection devices, such as air bags, seat belt retractors, seat belt pretensioners, etc.

A seat belt assembly (not shown) may also be associated with the vehicle seat and the assembly 10 or 310. The seat belt assembly would include a seat belt retractor, mounted for example to the vehicle floor pan, and a seat belt buckle connected to the upper track. The seat belt would extend from the retractor to the buckle across a vehicle occupant in the seat.

Figure 10:
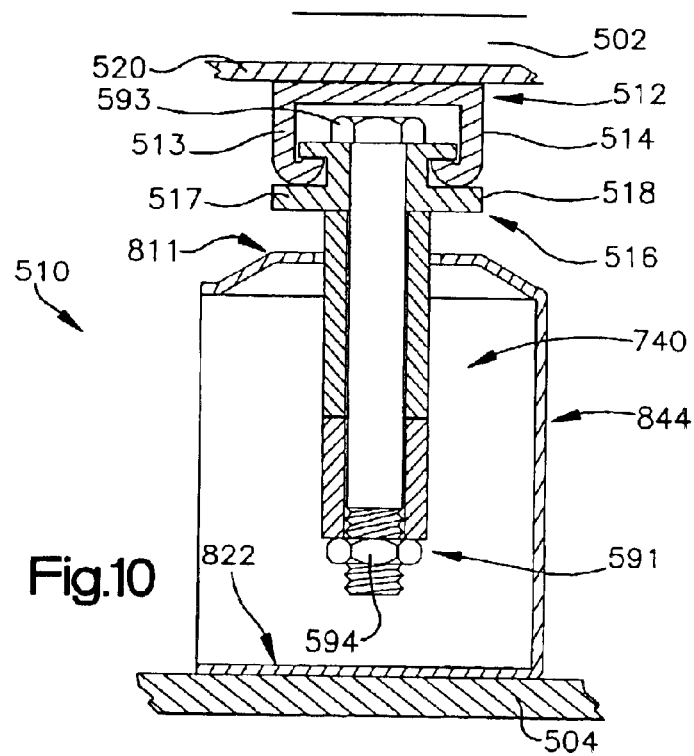
FIG. 10 is a schematic sectional view of the assembly of FIG. 9 taken along line 10—10 of FIG. 9.
Figure 9:
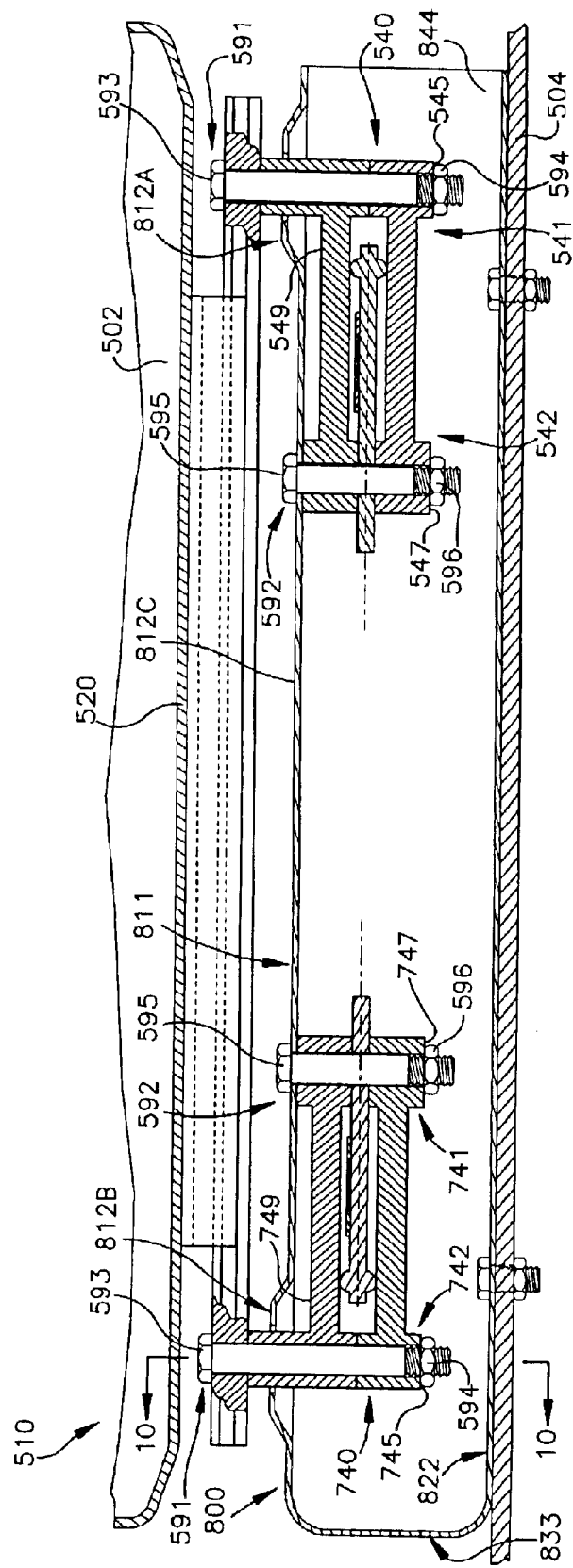
FIG. 9 is a schematic sectional view of an assembly embodying still another feature of the present invention.

In accordance with still another feature of the present invention, as shown in FIGS. 9 and 10, a load sensing assembly 510 is used in a vehicle having a seat 502 for a vehicle occupant. A vehicle floor pan 504 supports the assembly 510 and the vehicle seat 502. The assembly 510 includes a vehicle seat frame 520 for supporting a load of the vehicle occupant in the vehicle seat 502, an upper track 512 for supporting the vehicle seat frame, a lower track 516 for adjustably supporting the upper track, a first sensor 540 for transmitting part of the load of the vehicle occupant from the lower track, a second sensor 740 for transmitting another part of the load of the vehicle occupant from the lower track, a housing assembly 800 for transmitting the load of the vehicle occupant from the sensors to the vehicle floor pan, a first fastener assembly 591, and a second fastener assembly 592.

The vehicle seat frame 520 supports a weight load of the vehicle occupant in the vehicle seat 502. The load of the vehicle occupant in the vehicle seat 502 is transmitted from the vehicle seat frame 520 through the upper track 512, the lower track 516, the first and second sensors 540, 740, and the housing assembly 800 to the vehicle floor pan 504. During a vehicle collision, the seat frame 520 may also sustain upward and lateral loads and loads in other directions.

The upper track 512 is fixedly attached to the vehicle seat frame 520. The upper track 512 typically has two opposite side rails 513, 514 (FIG. 10). The lower track 516 has two opposite rails 517, 518 that slidingly engage the respective side rails 513, 514 of the upper track 512. The upper track 512 may slide on the lower track 516 for forward or rearward adjustment of the position of the seat 502 for occupants of different sizes, as is known in the art. It is known that some seats do not move. For these seats, the tracks 512, 516 may be omitted and the sensors 540, 740 attached directly to the vehicle seat frame 520.

The lower track 516 is supported by the first sensor 540 and the second sensor 740. The sensors 540, 740 sense the load of the vehicle occupant. The sensors 540, 740 may each comprise a parallelogram linkage, sensor lever, and electrical component similar to the parallelogram linkage 50, sensor lever 70, and electrical component 79. Other suitable sensor configurations may also be used.

The first sensor 540 has a first end 541 and an opposite second end 542. The second sensor 740 has a first end 741 and an opposite second end 742.

The housing assembly 800 includes a first upper horizontal portion 811, a second lower horizontal portion 822, a third substantially vertical portion 833, and a fourth substantially vertical portion 844. The first, second, and third portions 811, 822, 833 define a C-shaped configuration, as viewed in FIG. 9. The fourth portion 844 interconnects the first, second, and third portions 811, 822, 833 thereby defining a partially enclosed housing in which the sensors 540, 740 are disposed. The first upper horizontal portion 811 has a first upper area 812A, a second upper area 812B, and a third lower area 812C interconnecting the first and second areas.

The first fastener assembly 591 includes two fasteners 593 and two fastener members 594. The fasteners 593 may be bolts or rivets with heads that engage the lower track 516. As viewed in FIGS. 9 and 10, the shaft of the fasteners 593 extend downward from the heads through openings in the lower track 516, openings in the first and second areas 812A, 812B of the housing assembly 800, and openings in the first ends 541, 741 of each sensor 540, 740, respectively.

The fastener members 594 may be nuts that are threaded onto bolts or fasteners attached to the shafts of rivets. The fastener members 594 engage lower surfaces 545, 745 of the first ends 541, 741 of each sensor 540, 740. The fasteners 593 and fastener members 594 thereby fixedly secure the lower track 516 and the sensors 540, 740 together as the fastener members 594 are tightened sufficiently against lower surfaces 545, 745 of the first ends 541, 741 of the sensors.

The fastener members 594 should be secured to the fasteners 593 in order to produce a clamping force sufficient to prevent relative movement of the elements between the heads of the fasteners and the fastener members under any possible load conditions. If the fasteners 593 are bolts and the fastener members 594 are nuts, tightening the nuts to torques of at least 60 nm typically achieves this.

The second fastener assembly 592 includes two fasteners 595 and two fastener members 596. The fasteners 595 may be bolts or rivets with heads that engage the third lower area 812C of the housing assembly 800. As viewed FIGS. 9 and 10, the shaft of the fasteners 595 extend downward from the heads through openings in the third lower area 812C of the housing assembly 800 and openings in the second ends 542, 742 of the sensors 540, 740.

The fastener members 596 may be nuts that are threaded onto bolts or fasteners attached to the shafts of rivets. The fastener members 596 engage lower surfaces 547, 747 of the second ends 542, 742 of the sensors 540, 740. The fasteners 595 and fastener members 596 thereby fixedly secure the housing assembly 800 and the second ends 542, 742 of the sensors 540, 740 together as the fastener members are tightened sufficiently against the lower surfaces 547, 747 of the sensors.

The fastener members 596 should be secured to the fasteners 595 in order to produce a clamping force sufficient to prevent relative movement of the elements between the heads of the fasteners and the fastener members under any possible load conditions. If the fasteners 595 are bolts and the fastener members 596 are nuts, tightening the nuts to torques of at least 60 nm typically achieves this.

The fasteners 593, 595 and the fastener members 594, 596 of each fastener assembly 591, 592 may be constructed of a suitable metal such as stainless steel. Other materials with corrosion-resistant coatings and sufficient strength may also be used.

The sensors 540, 740 may be further secured against lateral and rotational movement relative to the housing assembly 800. Third and fourth fastener assemblies (not shown) may further secure the first ends 541, 741 of the sensors 540, 740 to the lower track 516 and the second ends 542, 742 to the housing assembly 800, respectively, thereby preventing rotation of the sensors relative to the housing assembly in a horizontal plane about a vertical axis.

When a downward load is placed on the vehicle seat frame 520, the downward load is transmitted through the vehicle seat frame, the upper track 512, and the lower track 516 to the first ends 541, 741 of the sensors 540, 740. Since the second ends 542, 742 of the sensors 540, 740 are fixed to the housing assembly 800, the vehicle seat frame 520 resiliently deflects the sensors, as discussed above with respect to FIGS. 1–6.

The sensors 540, 740 act in tandem as spring elements and transfer the load from the vehicle seat frame 520 to the housing assembly 800 and the vehicle floor pan 504. An assembly 510 may be fixed to the vehicle floor pan 504 at two locations, i.e., at each side of the seat 502. Thus, the vehicle seat frame 520 is constrained to move only vertically (linearly downward). The vehicle seat frame 520 does not move horizontally or rotationally.

The sensors 540, 740 may deflect downward until the lower track 516 contacts the first upper area 812A and/or the second upper area 812B of the housing assembly 800, at which point the linkages may deflect downward no further. At this point, all downward loads will be transmitted directly through the housing assembly 800. This protects the sensors 540, 740 from downward vertical load damage.

When an upward load is placed on the vehicle seat frame 520, the upward load is transmitted through the vehicle seat frame, the upper track 512, and the lower track 516 to the first ends 541, 741 of the sensors 540, 740. Since the second ends 542, 742 of the sensors 540, 740 are fixed to the housing assembly 800, the vehicle seat frame 520 resiliently deflects the sensors, as discussed above with respect to FIGS. 1–6.

The sensors 540, 740 act in tandem as spring elements and transfer the load from the vehicle seat frame 520 and the housing assembly 800 to the vehicle floor pan 504. An assembly 510 may be fixed to the vehicle floor pan 504 at two locations, i.e., at each side of the seat 502. Thus, the vehicle seat frame 520 is constrained to move only vertically (linearly upward). The vehicle seat frame 520 does not move horizontally or rotationally.

The sensors 540, 740 may deflect upward until upper surfaces 549, 749 of the sensors 540, 740 contact a lower surface 815 of the lower area 812C of the housing assembly 800, at which point the sensor may deflect upward no further. At this point, all upward loads will be transmitted directly through the housing assembly 800. This protects the sensors 540, 740 from upward vertical load damage.

Typically, a maximum deflection of 1.25 mm downward and 1.25 mm upward deflection is provided when loads are placed on the vehicle seat frame 520 by a vehicle occupant. The sensors 540, 740 may receive cross-car forces. Such forces may impart torsional forces to the sensors 540, 740. However, any rotation that is incurred by the sensors 540, 740 will not significantly affect the spring rate, or stiffness, of the sensors to vertical loading, as discussed above with respect to FIGS. 1–6.

From the above description of the invention, those skilled in the art will perceive improvements, changes and modifications. Such improvements, changes and modifications are intended to be included within the scope of the appended claims.

Having described the invention, the following is claimed:

1. An assembly for use in a vehicle having a seat for a vehicle occupant and a vehicle floor pan for supporting the vehicle seat, said assembly comprising:

a vehicle seat frame for supporting a load of the vehicle occupant in the vehicle seat;

a sensor for sensing the load of the vehicle occupant and providing an output signal indicative of the amount of the load of the vehicle occupant; and a housing for transmitting the load of the vehicle occupant to the vehicle floor pan and enclosing said sensor to protect said sensor, said housing having a portion with a first surface and a second surface vertically offset from said first surface, said second surface limiting movement of said sensor when the load of the vehicle occupant is sensed by said sensor.

2. An assembly as defined in claim 1 wherein said sensor includes a sensor portion that moves in response to a change in the load of the vehicle occupant and said housing includes an over-travel limit portion for protecting said sensor from excessive movement of said sensor portion.

3. An assembly as set, forth defined in claim 2 wherein said sensor portion may move vertically in opposite directions and said housing limits over-travel of said sensor portion in both directions.

4. An assembly as set forth in claim 3 wherein said sensor portion is fastened to a seat rail, said seat rail being connected with said vehicle seat frame.

5. An assembly for use in a vehicle having a seat for a vehicle occupant and a vehicle floor pan for supporting the vehicle seat, said assembly comprising:

a vehicle seat frame for supporting a load of the vehicle occupant in the vehicle seat;

a sensor for sensing the load of the vehicle occupant and providing an output signal indicative of the amount of the load of the vehicle occupant;

a housing for transmitting the load of the vehicle occupant to the vehicle floor pan and enclosing said sensor to protect said sensor; and a shield member connected with said seat frame and said sensor portion, said shield member engaging said housing to limit movement of said sensor portion, said shield member having a vertical skirt portion for protecting said sensor from foreign objects.

6. An assembly as set, forth in claim 1 wherein said housing encloses at least two sensors associated with said vehicle seat frame.

7. An assembly for use in a vehicle having a seat for a vehicle occupant and a vehicle floor pan for supporting the vehicle seat, said assembly comprising:

a vehicle seat frame for supporting a load of the vehicle occupant in the vehicle seat;

a first sensor for sensing the load of the vehicle occupant and providing an output signal indicative of the part of the load of the vehicle occupant;

a second sensor for sensing the load of the vehicle occupant and providing an output signal indicative of the part of the load of the vehicle occupant;

a housing for transmitting the load of the vehicle occupant to the vehicle floor pan and enclosing said first and second sensors to protect said first and second sensors, said housing having a first horizontal portion, a second horizontal portion vertically offset from said first horizontal portion, and a third horizontal portion vertically offset from said first horizontal portion, said second horizontal portion limiting movement of said first sensor when the load of the vehicle occupant is sensed by said first sensor, said third horizontal portion limiting movement of said second sensor when the load of the vehicle occupant is sensed by said second sensor.

8. An assembly for use in a vehicle having a seat for a vehicle occupant and a vehicle floor pan for supporting the vehicle seat, said assembly comprising:

a vehicle seat frame for supporting a load of the vehicle occupant in the vehicle seat;

a sensor for sensing the load of the vehicle occupant and providing an output signal indicative of the amount of the load of the vehicle occupant; and a housing for transmitting the load of the vehicle occupant to the vehicle floor pan and enclosing said sensor to protect said sensor, said housing having a projecting member for engaging said sensor and preventing rotation of said sensor relative to said housing in a horizontal plane about a vertical axis.

9. The assembly as set forth in claim 1 wherein said vehicle seat frame includes a lower track connected to said housing, said lower track engaging an upper track, said upper track being movable relative to said lower track for adjusting the vehicle seat for occupants of different sizes.

10. The assembly as set forth in claim 1 wherein said housing has four vertical portions, one of said vertical portions having an opening through which an electrical connector extends to said sensor.

11. The assembly as set forth in claim 1 further including a shield member overlying said housing and protecting said sensor from foreign objects.

12. The assembly as set forth in claim 1 wherein said housing has a first side portion, a second side portion opposite said first side portion, a third side portion generally perpendicular to said first side portion, and a fourth side portion opposite said third side portion, said side portions projecting vertically downward from said surfaces toward the vehicle floor pan and forming an enclosed chamber for said sensor when said housing is mounted to the vehicle floor pan.

13. The assembly as set forth in claim 12 wherein said sensor includes a parallelogram linkage for transmitting the load of the vehicle occupant from said vehicle seat frame, said parallelogram linkage vertically deflecting in response to the load of the vehicle occupant, said sensor further including means for sensing deflection of said parallelogram linkage.

14. The assembly as set forth in claim 13 wherein said parallelogram linkage has a first end portion extending vertically upward out of said chamber through an opening in said portion and a second, opposite end portion mounted to a lower surface of said portion, said first end portion having a placement pin extending vertically upward from said first end portion.

15. The assembly as set forth in claim 7 wherein said sensors are connected to said first horizontal portion of said housing.

16. The assembly as set forth in claim 15 further including a fastener assembly for securing said sensors to said first horizontal portion of said housing.

17. An assembly for use in a vehicle having a seat for a vehicle occupant and a vehicle floor pan for supporting the vehicle seat, said assembly comprising:

a vehicle seat frame for supporting a load of the vehicle occupant in the vehicle seat;

a sensor for sensing the load of the vehicle occupant and providing an output signal indicative of the amount of the load of the vehicle occupant, said sensor including a sensor portion that moves in response to a change in the load of the vehicle occupant; and a housing for transmitting the load of the vehicle occupant to the vehicle floor pan, said housing including an over-travel limit portion for protecting said sensor from excessive movement of said sensor portion, said housing having a horizontal portion, a first side portion, a second side portion opposite said first side portion, a third side portion generally perpendicular to said first side portion, and a fourth side portion opposite said third side portion, said side portions projecting vertically downward from said horizontal portion toward the vehicle floor pan and forming an enclosed chamber for said sensor when said housing is mounted to the vehicle floor pan.

18. An assembly as set forth in claim 17 further including a member connected with said vehicle seat frame and said sensor portion, said member engaging said housing to limit movement of said sensor portion.

19. An assembly as set forth in claim 17 wherein said sensor portion is fastened to a seat rail, said seat rail being connected with said vehicle seat frame.

20. An assembly as set forth in claim 17 wherein said sensor portion may move vertically in opposite directions and said housing limits over-travel of said sensor portion in both directions.

21. An assembly as set forth in claim 17 wherein said housing encloses said sensor to protect said sensor.

22. An assembly as set forth in claim 21 wherein said horizontal portion has a first horizontal surface and a second horizontal surface vertically offset from said first horizontal surface, said second horizontal surface limiting movement of said sensor when the load of the vehicle occupant is sensed by said sensor.

23. The assembly as set forth in claim 17 wherein said housing has a projecting member for engaging said sensor and preventing rotation of said sensor relative to said housing in a horizontal plane about a vertical axis.

24. The assembly as set forth in claim 17 wherein said housing has an opening through which an electrical connection to said sensor extends.

25. The assembly as set forth in claim 17 further including a shield member overlying said housing and protecting said sensor from foreign objects.

26. The assembly as set forth in claim 17 wherein said vehicle seat frame includes a lower track connected to said sensor, said lower track engaging a upper track, said upper track being movable relative to said lower track for adjusting the vehicle seat for occupants of different sizes.

27. The assembly as set forth in claim 17 wherein said sensor includes a first beam and a second beam parallel to said first beam, said first and second beans each having adjacent interconnected first ends that receive the load of the vehicle occupant, said first and second beams each further having adjacent interconnected second ends, said second ends transmitting the load of the vehicle occupant to the vehicle floor pan, said first and second beans each bending in response to the load of the vehicle occupant.

28. The assembly as set forth in claim 27 wherein said first and second beams form a parallelogram linkage for transmitting the load of the vehicle occupant from said vehicle seat frame, said parallelogram linkage vertically deflecting in response to a change in the load of the vehicle occupant, and means for sensing deflection of said parallelogram linkage.

29. The assembly as set forth in claim 28 wherein said parallelogram linkage has a first end portion extending vertically upward out of said chamber through an opening in said horizontal portion and a second, opposite end portion mounted to a lower surface of said horizontal portion.

30. An assembly for use in a vehicle having a seat for a vehicle occupant, a floor pan, and a cross bar located between the vehicle seat and the floor pan, said assembly comprising:

a vehicle seat frame for supporting a load of the vehicle occupant in the vehicle seat;

a sensor for sensing the load of the vehicle occupant and providing an output signal indicative of the amount of load of the vehicle occupant; and a housing supporting said sensor, said housing being for fixed attachment to the cross bar and transmitting the load of the vehicle occupant to the vehicle floor pan through the cross bar.

31. An assembly as set forth in claim 30 wherein said sensor has a sensor portion which may move vertically in opposite directions in response to a change in the load of the vehicle occupant, said housing comprising an over-travel limit for said sensor portion in both directions.

32. An assembly as defined in claim 31 wherein said housing includes a horizontal portion and a vertical portion forming an L-shaped configuration, said vertical portion having an opening through which a projecting member of said horizontal portion extends, said opening defining a limit for vertical deflection of said sensor.

33. The assembly as set forth in claim 30 wherein said cross bar is U-shaped having a base and a pair of spaced walls extending from said base, said housing being for fixed attachment to one of said spaced walls.

* * * * *

UNITED STATES PATENT AND TRADEMARK OFFICE
CERTIFICATE OF CORRECTION

PATENT NO.    : 6,835,899 B2
DATED         : December 28, 2004
INVENTOR(S)   : George B. Wolfe et al.

It is certified that error appears in the above-identified patent and that said Letters Patent is hereby corrected as shown below:

Column 18,
Line 1, after "second" change "beans" to -- beams --.

Signed and Sealed this

Twenty-fourth Day of May, 2005

JON W. DUDAS
*Director of the United States Patent and Trademark Office*